W. G. SHELTON.
MIXING DEVICE.
APPLICATION FILED MAY 8, 1911.

1,082,243.

Patented Dec. 23, 1913.
2 SHEETS—SHEET 1.

WITNESSES:
René Bruine
Fred White

INVENTOR:
William Gentry Shelton,
By Attorneys,
Fraser Fink & Myers

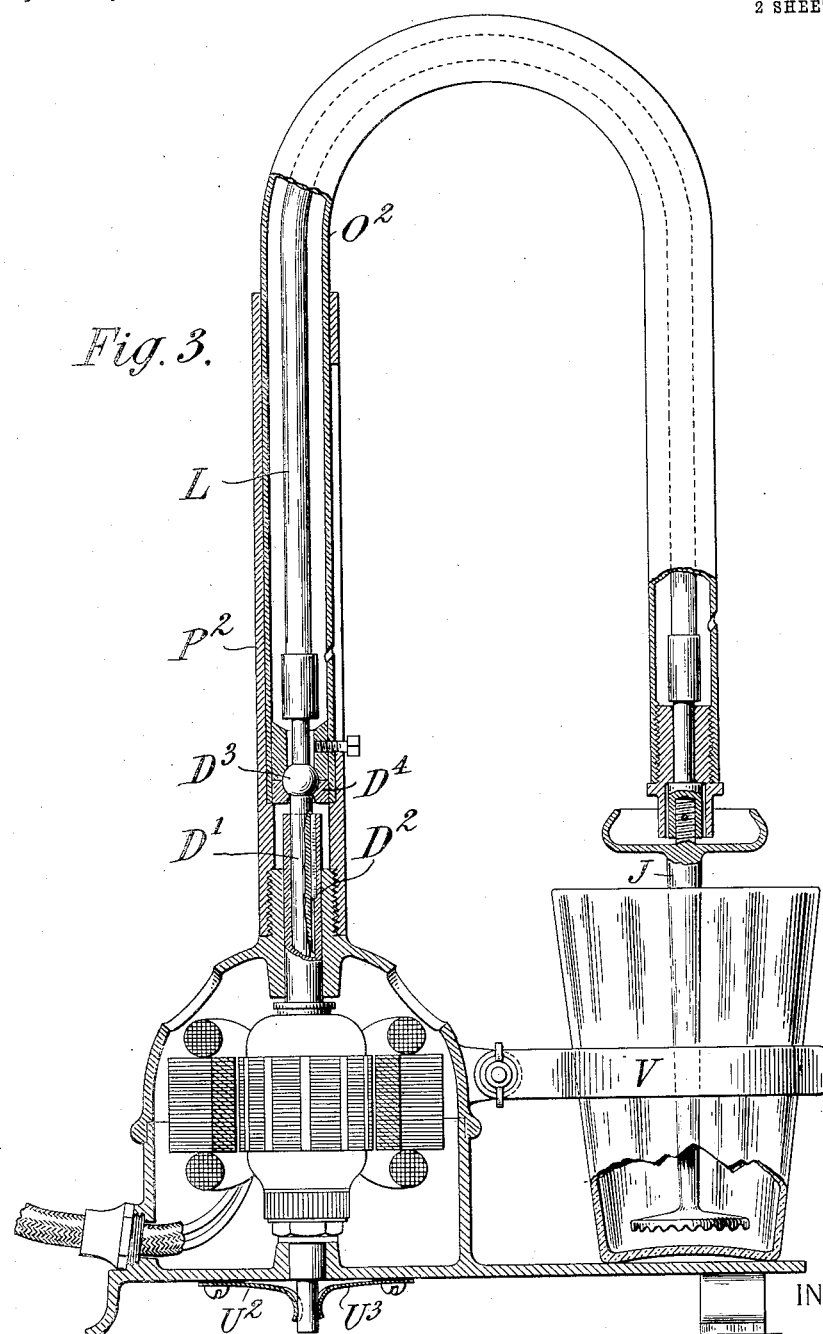

UNITED STATES PATENT OFFICE.

WILLIAM GENTRY SHELTON, OF NEW YORK, N. Y.

MIXING DEVICE.

1,082,243.

Specification of Letters Patent.   Patented Dec. 23, 1913.

Application filed May 3, 1911.   Serial No. 625,861.

*To all whom it may concern:*

Be it known that I, WILLIAM GENTRY SHELTON, a citizen of the United States, residing in the borough of Manhattan, city, county, and State of New York, have invented certain new and useful Improvements in Mixing Devices, of which the following is a specification.

This invention relates to certain improvements in devices for mixing soda water or other drinks, although it is applicable in mixing, beating or stirring other liquids.

In the preparation of soda water or other aerated beverages wherein syrup, cream or other liquid or powdered substance are to be mixed with aerated water, it is desirable to provide a power-operated device which is capable of quickly performing the mixing operation so that the time of the attendant shall be economized.

My invention provides an electrically-driven device of this character which is simple and compact in structure, easily operated and efficient in its action.

To this end in the preferred form of my invention I provide a base or standard in the lower part of which is housed a small electric motor, preferably mounted upon an upright axis, and I also provide a stirring device which is vertically arranged and which is connected with the shaft and motor by a suitable form of flexible shaft. By preference the stirring or mixing device is carried by a vertically movable holder which is lowered and raised to move the stirring or mixing device into and out of the glass or other receptacle. Preferably also means are provided whereby the motor is started and stopped by movements of the mixing device.

My invention includes certain other improvements which will be hereinafter more fully described.

Figure 1:
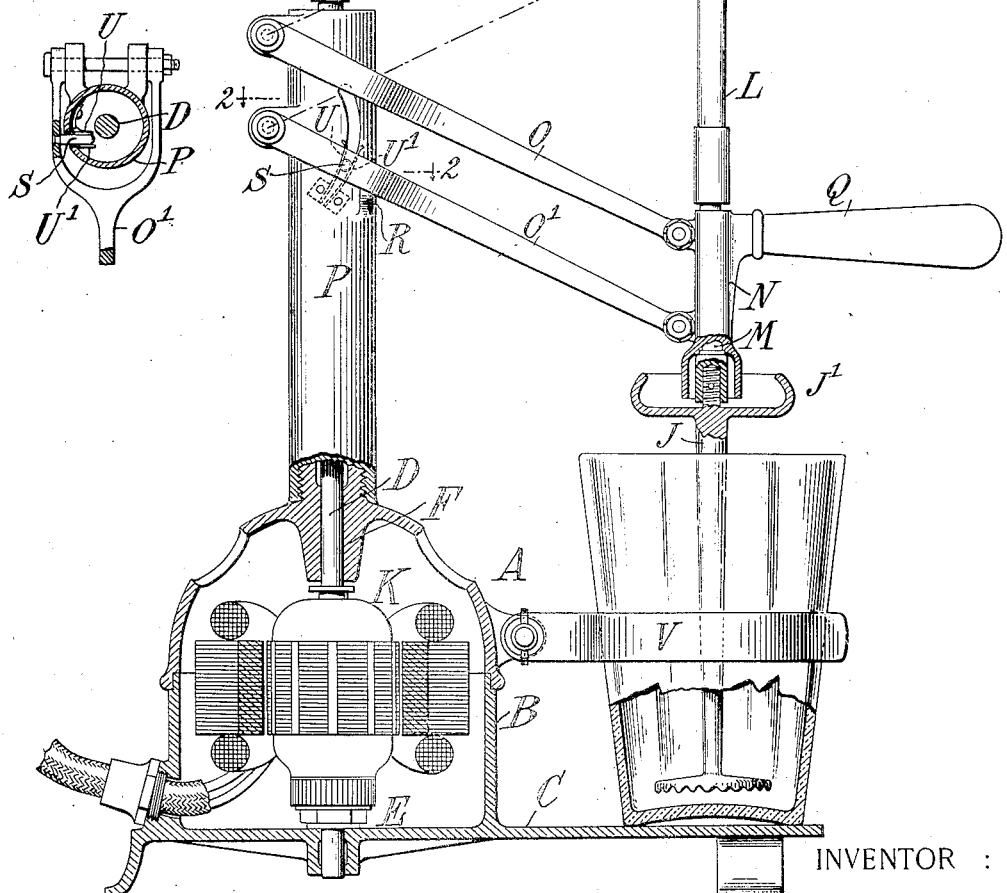
Figure 2:
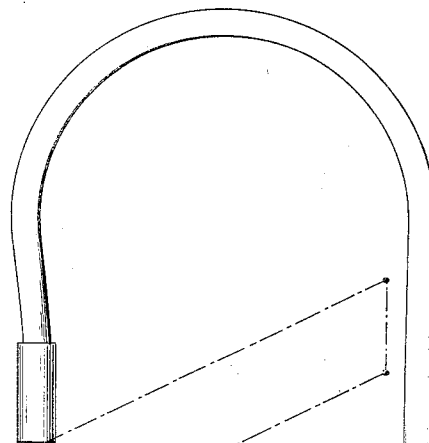

Referring to the drawings which illustrate several embodiments of the invention,—Figure 1 is a side elevation partly in vertical section of one form of the invention. Fig. 2 is a cross section on the line 2—2 of Fig. 1. Fig. 3 is an elevation partly in vertical section of another form of the invention.

Referring to the drawings let A indicate a suitable base or standard which is preferably formed with a motor casing B and a stand or support C for the glass or other receptacle whose contents are to be mixed. The casing and stand are preferably cast in one piece as shown.

The motor may be of any suitable type, the armature of which is fixed to a shaft D rotating in bearings E and F formed in the casing B. The construction of the motor *per se* forms no part of the present invention.

Extending above the stand C is a suitable stirring or mixing device J which preferably comprises a shank having its lower end shaped to produce the required mixing effect, such as the wheel shaped member shown having suitable mixing projections.

My invention provides a means for operating the mixer J in its vertical position from motor K, such means preferably permitting the lowering and raising of the mixer into and out of the receptacle containing the substance to be stirred. In the form shown these means comprise a flexible shaft L connected at one end with the mixer J and at the other end with the shaft D. Preferably a holder M is provided for the mixer J, to which holder the mixer is screwed or otherwise detachably connected, the holder preferably rotating in a bearing block N suitably supported for the purpose. The opposite end of the flexible shaft L is preferably connected to the shaft D at its upper end as shown.

Preferably means are provided for supporting the mixer and shaft L in such manner that the mixer may be raised and lowered, and held at any desired point. Preferably such means comprise a pair of parallel levers O O' which are pivoted at one end to a tube or support P fixed to the upper side of the motor casing and at their other ends are pivoted to the bearing block N. Preferably also the bearing block N is provided with a handle Q by means of which the mixer J may be raised and lowered. The result of this construction is that the mixer J may be given a substantially vertical movement into and out of the glass or other receptacle. A suitable stop R may also be provided upon the tube P for limiting the downward movement of the levers O O', so that in the lowermost position of the mixer its head is held a short distance from the glass support C.

Any suitable means may be provided for starting and stopping the motor, but according to the present invention I prefer that these means shall be controlled by the raising and lowering of the mixer. This may be accomplished in any suitable manner, but in Fig. 1 I have shown a movable switch S which is carried upon the lever O' and is adapted to be moved in one direction to close the motor circuit, and in the opposite direction to open the motor circuit. The switch S preferably comprises a conducting pin passing through a slot in the tube P and fixed to the lever O' as shown. The pin is adapted to be pressed between switch points U U' as the switch descends and separated therefrom as the arm ascends. The contact points U U' are connected with the motor circuit so that when the switch is depressed the motor starts, and when the switch is elevated the motor circuit is broken and the motor stops.

In order to avoid any possibility of oil being thrown outwardly by centrifugal force from the bearing N, the mixer J may be provided with a flange J' which extends above the lower part of the bearing and serves to catch any oil which may leak down through the bearing. Suitable spring arms V V may be employed to assist in holding the receptacle.

The operation of my device is apparent. The glass or other receptacle containing the substance to be mixed is placed beneath the mixer J and the handle Q grasped by the operator and the mixer lowered therein. Preferably the latter does not rotate until it nears the bottom of the receptacle whereupon the motor is automatically started. When the contents of the receptacle have been sufficiently mixed, the handle Q is elevated, the motor being stopped by this movement, and the mixer J being withdrawn from the receptacle. If desired the pivotal bearings of the arms O O' may be constructed with sufficient friction to sustain the mixer J in its upper position, or any other device may be provided to accomplish this result.

In Fig. 3 I have illustrated a modification of the device. In this construction I utilize the flexible shaft L as before, but in lieu of the parallel arms O O' I provide a tube $O^2$ which is mounted to slide in a tube $P^2$ fixed to the upper part of the motor casing. In this construction the lower end of the flexible shaft L is connected to a sliding shaft D' which passes through a motor shaft $D^2$, the latter in this case being made hollow. The sliding shaft D' is splined to the shaft $D^2$ in such manner as to partake of the rotary movements of the latter. The shaft D' is provided at its upper end with a circular knob or bearing face $D^3$ which is held in a bearing $D^4$ carried by the lower end of the tube $O^2$. By this construction as the tube is raised and lowered the shaft D' is given a corresponding movement. This movement is utilized to start and stop the motor, preferably by the lower end of the shaft D' making electrical contact with the spring arms $U^2$ $U^3$ located in the base of the motor casing.

While I have shown and described several embodiments of my invention, it is to be understood that I do not wish to be limited thereto as various modifications can be made therein without departing from the invention. It will also be understood that while I have illustrated my invention as applied to a soda water mixer, it can be utilized in many other connections, as for instance in mixing or stirring any other liquids, beating eggs, whipping cream or the like, and such modifications will, of course, be made as will best fit the device for the particular purpose in view.

What I claim is:—

1. In a mixing device or the like, the combination of a fixed motor, a movable mixer, a pair of parallel levers for said mixer adapted to guide the same in a substantially vertical direction, and means for transmitting motion from the motor to the mixer.

2. In a mixing device or the like, the combination of a base or standard, a motor fixed relatively thereto, a mixing device adapted to be raised and lowered, a pair of parallel levers adapted to guide said mixer in a substantially vertical direction, a flexible shaft for transmitting motion from said motor to said mixer, and a switch adapted to be moved by said levers to start the motor when the mixer is lowered and to stop the motor when the mixer is raised.

3. In a mixing device or the like, the combination of a base or standard, a motor casing fixed thereto, a motor within said casing, an upright tube fixed to said motor casing, a flexible shaft one end of which is connected to the motor shaft, a mixer, a holder for said mixer connected with the other end of said flexible shaft, a bearing for said holder, a pair of parallel levers connected with said bearing and with said upright tube, a switch adapted to start and stop said motor, said switch being adapted to be engaged by one of said parallel levers to start the motor when said mixer is depressed and being adapted to be engaged by the other of said levers to stop the motor when said lever is elevated.

4. In a mixing device or the like, the combination of a fixedly mounted motor, a mixer movable into and out of a receptacle adapted to rest upon a fixed support, said mixer being adapted to remain in position within the receptacle when left alone, a flexible shaft connecting said motor and mixer for transmitting motion from said motor to said mixer, and means operated by the movement of said mixer into and out of position in the receptacle for putting said motor into and out of operation.

5. In a mixing device or the like, the combination of a fixedly mounted motor, a mixer movable into and out of a receptacle adapted to rest upon a fixed support, said mixer being adapted to remain in position within the receptacle when left alone, a flexible shaft connecting said motor and mixer for transmitting motion from said motor to said mixer, means operating independently of the receptacle for limiting the descent of said mixer into the receptacle, and means operated by the movement of said mixer into and out of position in the receptacle for putting said motor into and out of operation.

6. In a mixing device or the like, the combination of a motor, a mixer movable into and out of a receptacle adapted to rest upon a fixed support, a flexible shaft connecting said motor and mixer for transmitting motion from said motor to said mixer, said mixer being detachable and having a cupped guard integrally formed at its upper end, and a screw threaded coupling part above said guard.

7. In a mixing device or the like, the combination of a motor, a mixer movable into and out of a receptacle adapted to rest upon a fixed support, a flexible shaft connecting said motor and mixer for transmitting motion from said motor to said mixer, said mixer being detachable and having a cupped guard integrally formed at its upper end, and a screw threaded projection above said guard.

In witness whereof, I have hereunto signed my name in the presence of two subscribing witnesses.

WILLIAM GENTRY SHELTON.

Witnesses:
FRED WHITE,
THOMAS F. WALLACE.